United States Patent
Sisk

(10) Patent No.: US 10,753,526 B2
(45) Date of Patent: Aug. 25, 2020

(54) UNLOAD ELBOW WITH SPHERICAL WEAR POCKET

(71) Applicant: David E. Sisk, Park Hills, MO (US)

(72) Inventor: David E. Sisk, Park Hills, MO (US)

(73) Assignee: Bulk Tank Inc., Park Hills, MO (US)

( * ) Notice: Subject to any disclaimer, the term of this patent is extended or adjusted under 35 U.S.C. 154(b) by 481 days.

(21) Appl. No.: 14/544,908

(22) Filed: Mar. 9, 2015

(65) Prior Publication Data

US 2015/0308606 A1    Oct. 29, 2015

Related U.S. Application Data

(63) Continuation-in-part of application No. 29/463,471, filed on Dec. 4, 2013.

(60) Provisional application No. 61/995,906, filed on Apr. 25, 2014.

(51) Int. Cl.
*F16L 57/06*    (2006.01)
*F16L 43/00*    (2006.01)

(52) U.S. Cl.
CPC .......... *F16L 57/06* (2013.01); *F16L 43/002* (2013.01)

(58) Field of Classification Search
CPC ................................. F16L 43/003; F16L 57/06
USPC ..................... 285/179; 406/193; 137/808
See application file for complete search history.

(56) References Cited

U.S. PATENT DOCUMENTS

| | | | |
|---|---|---|---|
| D22,865 S | 10/1893 | Pierce et al. | |
| 794,165 A | 7/1905 | Dozier et al. | |
| 1,436,331 A | 11/1922 | Ayling | |
| 1,762,713 A | 6/1930 | Dill | |
| 3,640,845 A * | 2/1972 | Ripley | F16J 15/44 |
| | | | 137/808 |
| 3,791,679 A | 2/1974 | Glover | |
| 4,070,044 A | 1/1978 | Carrow | |
| 4,174,859 A | 11/1979 | Houghton | |
| D255,596 S | 6/1980 | Johnson | |
| D304,486 S | 11/1989 | Elder et al. | |
| 5,158,114 A | 10/1992 | Botsolas | |
| D337,959 S | 8/1993 | Lawhon et al. | |
| D347,271 S | 5/1994 | Inda et al. | |
| D419,217 S | 1/2000 | Lee | |
| D465,012 S | 10/2002 | Tauzer | |
| D476,074 S | 6/2003 | Stout, Jr. | |
| D499,166 S | 11/2004 | Weidmann | |
| D590,481 S | 4/2009 | Stimpson | |
| 7,543,857 B2 * | 6/2009 | Dole | F16L 37/18 |
| D599,446 S | 9/2009 | Price et al. | |
| D615,630 S | 5/2010 | Price et al. | |
| D634,818 S | 3/2011 | Leroyer | |
| D650,888 S | 12/2011 | Moretto | |
| D678,484 S | 3/2013 | Dietterle et al. | |

(Continued)

FOREIGN PATENT DOCUMENTS

EP    0 195 528 A1 *  9/1986  ............ 406/193

*Primary Examiner* — Greg Binda
(74) *Attorney, Agent, or Firm* — Paul M Denk

(57) ABSTRACT

An unload elbow with spherical wear pocket is disclosed which comprises a body having an inlet end, an outlet end, and a spherical wear pocket formed near the outlet end. The spherical wear pocket is capable of trapping material that is being unloaded through the unload elbow to trap a portion of material being unloaded so that any other material being unloaded will contact the trapped material and not impact the wear pocket to prematurely wear out the unload elbow.

13 Claims, 4 Drawing Sheets

(56) References Cited

U.S. PATENT DOCUMENTS

| | | | | |
|---|---|---|---|---|
| 8,419,072 B2* | 4/2013 | Sisk | ..................... | F16L 43/001 |
| | | | | 285/179 X |
| D682,399 S | 5/2013 | Funderburg | | |
| D726,288 S * | 4/2015 | Sisk | | |
| 9,328,855 B2* | 5/2016 | Sisk | ........................ | F16L 37/18 |
| 2004/0244853 A1* | 12/2004 | Harman | .................... | F01N 1/12 |
| | | | | 137/808 |
| 2010/0108595 A1 | 5/2010 | Heelan, Jr. | | |
| 2013/0292937 A1 | 11/2013 | Manning et al. | | |
| 2015/0247596 A1* | 9/2015 | Crawford | ............ | F16L 27/0849 |
| | | | | 285/179 |

* cited by examiner

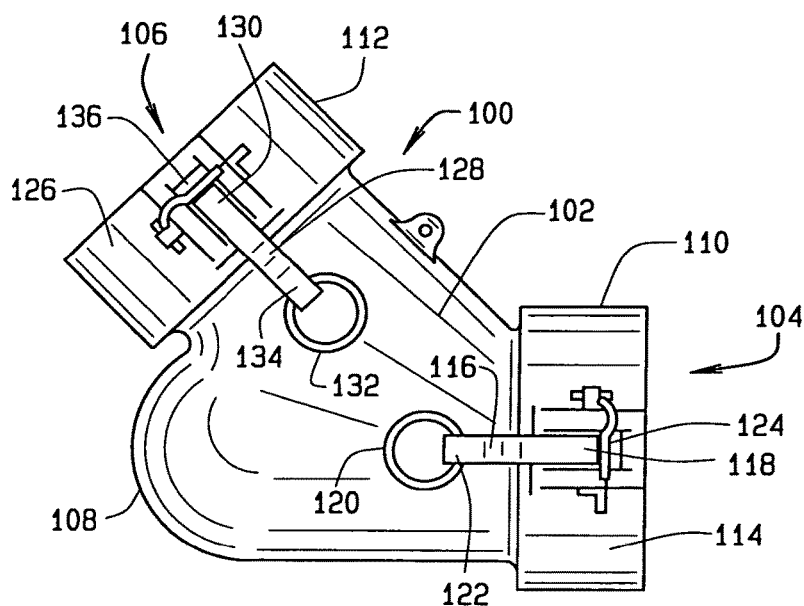
FIG.6
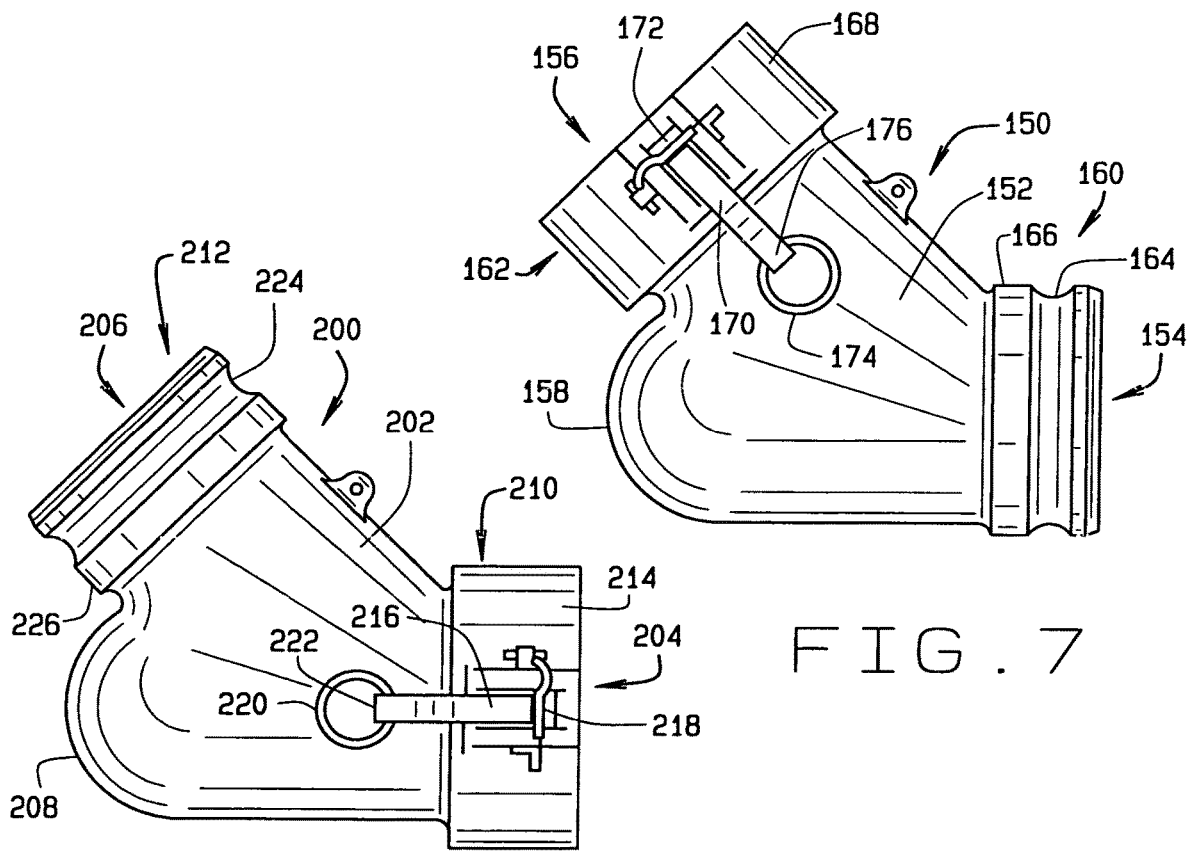
FIG.7
FIG.8

UNLOAD ELBOW WITH SPHERICAL WEAR POCKET

CROSS REFERENCE TO RELATED APPLICATION

This non-provisional patent application claims priority to the provisional patent application having Ser. No. 61/995,906, filed on Apr. 25, 2014; and this non-provisional application claims priority as a continuation-in-part to the design patent application having Ser. No. 29/463,471 filed on Dec. 4, 2013, now U.S. Pat. No. D726,288.

It is believed a proper cross-reference has been made.

FIELD OF THE INVENTION

This disclosure generally relates to conduit or pipe couplers, and more particularly to an unload elbow with spherical pocket that resists against wear through abrasion by material being unloaded through the unload elbow.

BACKGROUND OF THE INVENTION

Dry product, such as pellets, powders, sand, oil sand, and other abrasive materials, may be stored and shipped in bulk containers such as railroad tank cars and tank trailers for transportation from one site, such as a mine, to be delivered to another site, such as a manufacturing plant. The delivered product exits from the storage compartment of the transport carrier or tank trailer, and then flows through piping upon the trailer for delivery by hose or further piping to a storage facility or location of usage. In dry bulk hauling, the seal integrity at the pipe connection is essential to prevent cross contamination of the material sequentially hauled in the tank trailers. It is desirable to provide not only cleansed air that is used in the unloading process, but also to reduce the volume of noise involved in the discharge. The material unloaded from gravity gate valves or hoppers located on the bottom of the tank car, exit through tees that are attached to the bottom of a hopper which normally connect with a collection of pipes, that convey air under pressure to assist in the unloading process. A vacuum or air stream from a pneumatic conveyor system created in the piping system accelerates the unloading of dry bulk products from the hopper.

Presently, the bulk transporting industry favors downloading dry product from tank trailers by pneumatic systems. A pneumatic system begins with a blower mounted to a tractor, such as a truck. When turning at high revolutions per minute, the blower forces air into a discharge pipe that pressurizes the collection pipes below a trailer. The pressurized air then attracts by venturi flow the granular material, by gravity out of the tank trailer, and it is conveyed within the stream of the pressurized flowing air, to the site of storage. The pressurized air then delivers the dry bulk product from the collection pipes to the delivery point, commonly by way of a hose.

The tank trailer has a number of hoppers that each direct dry bulk material through a valve, such as a butterfly valve, into a hopper tee and then into the pressurized line. The line generally discharges towards the rear of the trailer, that is, towards the trailer wheels. After the last hopper, the line requires realignment to pass the rear axles. The line may pass either below or above the rear axles and in doing so, the line has an angular adjustment proximate the last hopper tee. A realigned line may discharge bulk material either in a high position above the axles or a low position beneath the axles. Some unloading arrangements include hoses or metal rear unload lines. Each change in direction calls for a fitting, more particularly an elbow, to realign the straight sections of pipe in the line. Abrasive material can rapidly or prematurely wear pipe and fittings that convey the material. Where a moving abrasive material changes direction of flow, forces accumulate and abrade or wear down a location upon a pipe or fitting. In time, the fitting has a hole worn into it that leaks product from the fitting or the fitting completely fails and discharges product out of the system. It has also been found that abrasive material causes the hoses or the metal rear unload lines to wear out prematurely.

In order to reduce the length of piping required, it is also known to discharge material from a side of the tank trailer. In this arrangement, a bend is connected to the hopper tee in order to direct the material out of the side of the tank trailer. The bend is also subject to wearing out prematurely where abrasive material excessively impacts certain points within the bend during an unloading operation. Although discharging from the side is convenient in some situations, it may be discouraged due to the bend wearing out prematurely and having to be replaced.

Furthermore, known clamps and elbows often have been constructed of cast iron and mild steel parts that corrode from exposure to the environment as a tank trailer, or hopper trailer, travels the roads subject to rain, snow, and deicing compounds. Once corroded, the clamps and elbows become nearly impossible to remove from a pipe. If this occurs then changing the clamp or elbow from beneath a hauler becomes a more difficult task. The driver must pry the corroded elbow from the line with a pry bar or a length of pipe. In some situations, the driver must hammer the elbow carefully to free it from the pipe. It would be desirable to incorporate quick disconnect fittings for the elbows to avoid this situation.

Also, some clamps and elbows having flanges that are not versatile because they do not easily connect or mate to different pipe sections. For example, elbows having flanges can easily connect to other flanged fittings but not to round pipe directly. An elbow may have to connect to a section of pipe that has a female connector or a male connector. In this particular situation, a flange will not be suitable to connect or mate to such a pipe. It would be advantageous to have elbows that easily connect pipes having a female or a male connector.

The present disclosure is designed to obviate and overcome many of the disadvantages and shortcomings experienced with prior discharge configurations. Moreover, the present disclosure is related to an unload elbow with spherical wear pocket that greatly reduces or eliminates the possibility of the unload elbow wearing out prematurely when being impacted by abrasive material or granular material passing through the unload elbow.

SUMMARY OF THE INVENTION

The present disclosure is directed to an unload elbow with spherical wear pocket which comprises a body having an inlet end, an outlet end, a passage between the inlet end and the outlet end, and a spherical wear pocket formed near the outlet end, a connector fitting formed around the inlet end, and a connector fitting formed around the outlet end.

The present disclosure is also directed to an unload elbow with spherical wear pocket which comprises a body having an inlet end, an outlet end, a passage between the inlet end and the outlet end, and a spherical wear pocket formed near the outlet end, a quick disconnect fitting formed around the inlet end, and a quick disconnect fitting formed around the outlet end.

The present disclosure is further directed to unload elbow assembly for forming a 90° change of direction of material flowing through the unload elbow assembly which comprises a first unload elbow with spherical wear pocket having a body having an inlet end, an outlet end, a passage between the inlet end and the outlet end, and a spherical wear pocket formed near the outlet end, a connector fitting formed around the inlet end, and a connector fitting formed around the outlet end, and a second unload elbow with spherical wear pocket having a body having an inlet end, an outlet end, a passage between the inlet end and the outlet end, and a spherical wear pocket formed near the outlet end, a connector fitting formed around the inlet end, and a connector fitting formed around the outlet end with the outlet end of the first unload elbow connected to the inlet end of the second unload elbow.

In light of the foregoing comments, it will be recognized that the present disclosure provides an unload elbow with spherical wear pocket that prevents a bend formed in the elbow from wearing out prematurely.

The present disclosure provides an unload elbow with spherical wear pocket that can be easily employed with highly reliable results in a pneumatic system which is used to unload cargo from a storage unit under the influence of moving pressurized air to move the cargo to a different location.

The present disclosure further provides an unload elbow with spherical wear pocket that can be easily connected or disconnected from a pipe, hose, or other conduit.

The present disclosure provides an unload elbow with spherical wear pocket that is easy to learn how to operate and does not require any advanced or special training.

The present disclosure provides an unload elbow with spherical wear pocket that provides an angled elbow that adjusts the angle of one pipe relative to an adjacent pipe for passage over the axles of a trailer.

The present disclosure provides an unload elbow with spherical wear pocket that is constructed of long lasting corrosion-resistant material.

The present disclosure also provides an unload elbow with spherical wear pocket that is constructed of relatively few parts or components, but attains far more significantly beneficial results, than what is provided using currently available devices.

The present disclosure further provides an unload elbow with spherical wear pocket that allows pressurized air and granular or abrasive material in a bulk tank discharge system to provide effective and efficient operations of the discharge system during discharge of its load at the site of delivery.

The present disclosure is also directed to an unload elbow with spherical pocket that is durable, long lasting, economical to manufacture.

The present disclosure is further directed to an unload elbow with spherical wear pocket that may be combined with another unload elbow with spherical wear pocket to form an assembly that can redirect the flow of air and material at a right angle and that also prevents or eliminates premature wear of each of the unload elbows.

These and other advantages of the present disclosure will become apparent to those skilled in the art after considering the following detailed specification in conjunction with the accompanying drawings.

BRIEF DESCRIPTION OF THE DRAWINGS

In referring to the drawings,

FIG. 6 is a side perspective view of another embodiment of an unload elbow with spherical wear pocket, and through its connector fittings, having a female inlet end and a female outlet end;

FIG. 7 is a perspective view of another embodiment of an unload elbow with spherical wear pocket having a male inlet end and a female outlet end;

FIG. 8 is a perspective view of another embodiment of an unload elbow with spherical wear pocket having a female inlet end and a male outlet end;

DESCRIPTION OF THE PREFERRED EMBODIMENT

Figure 1:
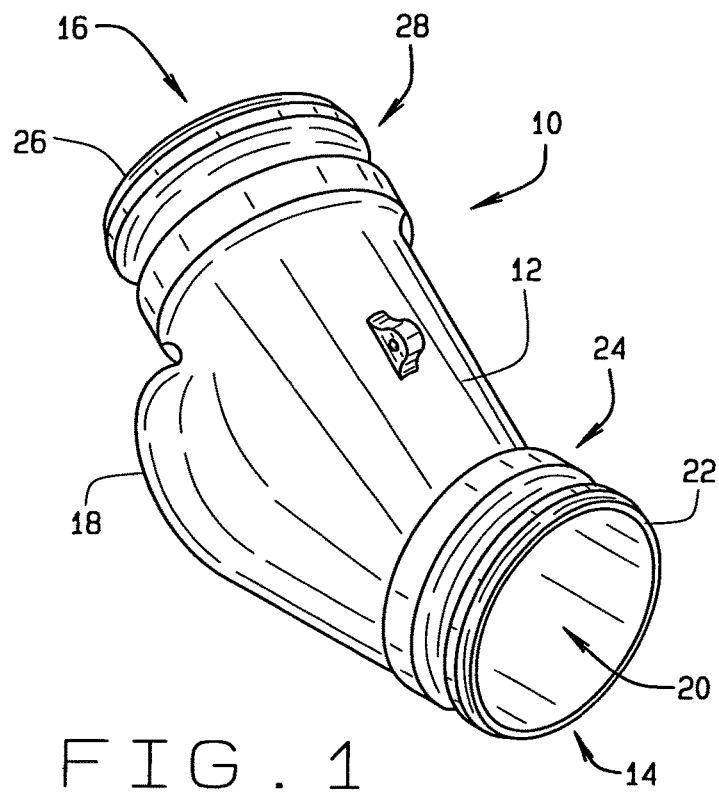
FIG. 1 is a perspective view of an unload elbow with spherical wear pocket constructed according to the present disclosure.
Figure 2:
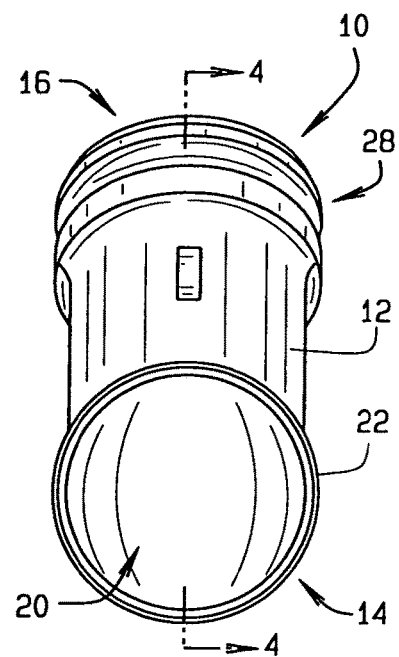
FIG. 2 is a front view of the unload elbow with spherical wear pocket shown in FIG. 1.

Referring now to the drawings, wherein like numbers refer to like items, number 10 identifies a preferred embodiment of an unload elbow with spherical wear pocket constructed according to the present disclosure. With reference now to FIGS. 1 and 2, the unload elbow with spherical wear pocket 10 comprises a body 12 having an inlet end 14, an outlet end 16, and a spherical wear pocket portion 18 formed near the outlet end 16. The inlet elbow 10 has a hollow interior or passage 20 in which material may flow from the inlet end 14 and out through the outlet end 16. The inlet end 14 has an opening 22 that is sized and shaped to mate with a pipe or a hose, both of which are not shown in these figures. The inlet end 14 is also a male connector end or fitting 24 that is constructed to have a pipe or a hose clamped thereon, as will be explained in detail further herein. The outlet end 16 has an opening 26 that is also sized and shaped to mate with a pipe or a hose. The outlet end 16 is further constructed having a male connector end or fitting 28 that is adapted to have a pipe or a hose clamped thereon. The unload elbow 10 is used to redirect flow of material by an angle of 45°.

Figure 3:
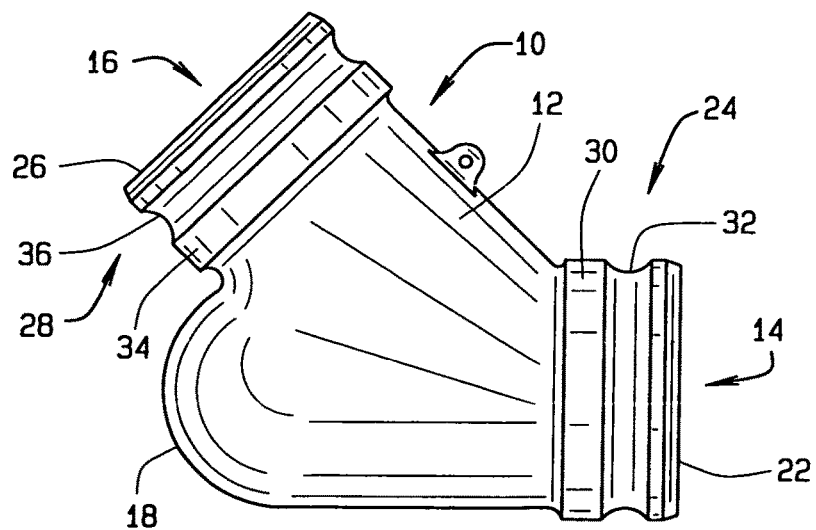
FIG. 3 is a side view of the unload elbow with spherical wear pocket shown in FIG. 1.

FIG. 3 is a side view of the unload elbow 10. The unload elbow 10 has the body 12, the inlet end 14, and the outlet end 16. The spherical wear pocket 18 is formed or positioned near the outlet end 16. The male connector fitting 24 has a cam surface 30 and a groove 32 which are adapted to receive a female connector or coupler (not shown). The male connector fitting 28 also has a cam surface 34 and a groove 36 that are used to receive a female connector. The female connector and its cam can be seen in my U.S. Pat. No. 9,328,855, which is incorporated herein by reference. The spherical wear pocket 18 is a bulbous extension of the body 12. The unload elbow 10 is shown having the openings 22 and 26, that are both sized and shaped to mate with a pipe or a hose.

Figure 4:
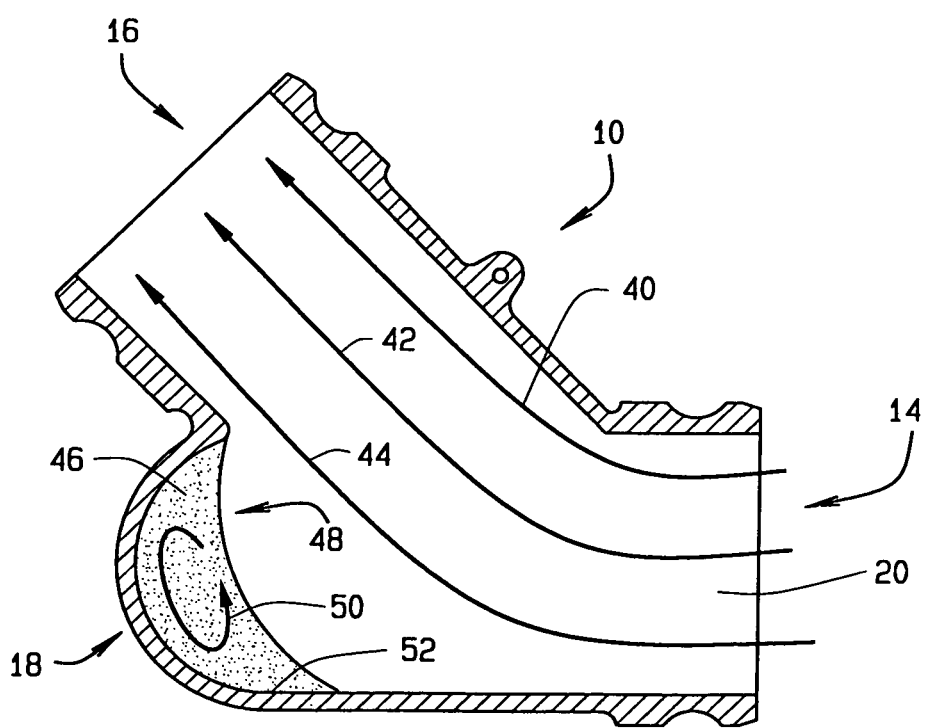
FIG. 4 is a cross-sectional view of the unload elbow with spherical wear pocket shown in FIG. 1 taken along the plane of line 4-4 of FIG. 2.

With reference now to FIG. 4, a cross-sectional view of the passage 20 of the unload elbow 10 is shown. The passage 20 is formed in the body 12 between the inlet end 14 and the outlet end 16. Air or material, as indicated by arrows 40, 42, and 44, flows from the inlet end 14 through the passage 20 and out through the outlet end 16. The wear pocket 18 traps a portion 46 of material 48 that is being unloaded through the unload elbow 10. In this manner, any material 48 that is flowing through the unload elbow 10 will wear against the portion 46 in the wear pocket 18 and will not wear or impact the unload elbow 10. This will prolong the life of the unload elbow 10.

Further, initial loading of the material 48 will flow through the passage 20 and the portion 46 will be captured, accumulated, or trapped in the wear pocket 18. As unloading continues, additional material 48 will impact the portion 46 or pass over the portion 46. A vortex of material, illustrated as an arrow 50 in the portion 46, will be generated by movement of the material 48 through the passage 20. Material 48 that flows through the passage 20 may replace the portion 46 that has accumulated in the wear pocket 18. As can be appreciated, the portion 46 of material 48 acts to protect or insulate an interior surface 52 of the wear pocket 18 from being impacted by the material 48. The portion 46 eliminates wear of the interior surface 52. The passage 20 has no other surfaces that can be impacted by the material 48 flowing through the unload elbow 10.

Figure 5:
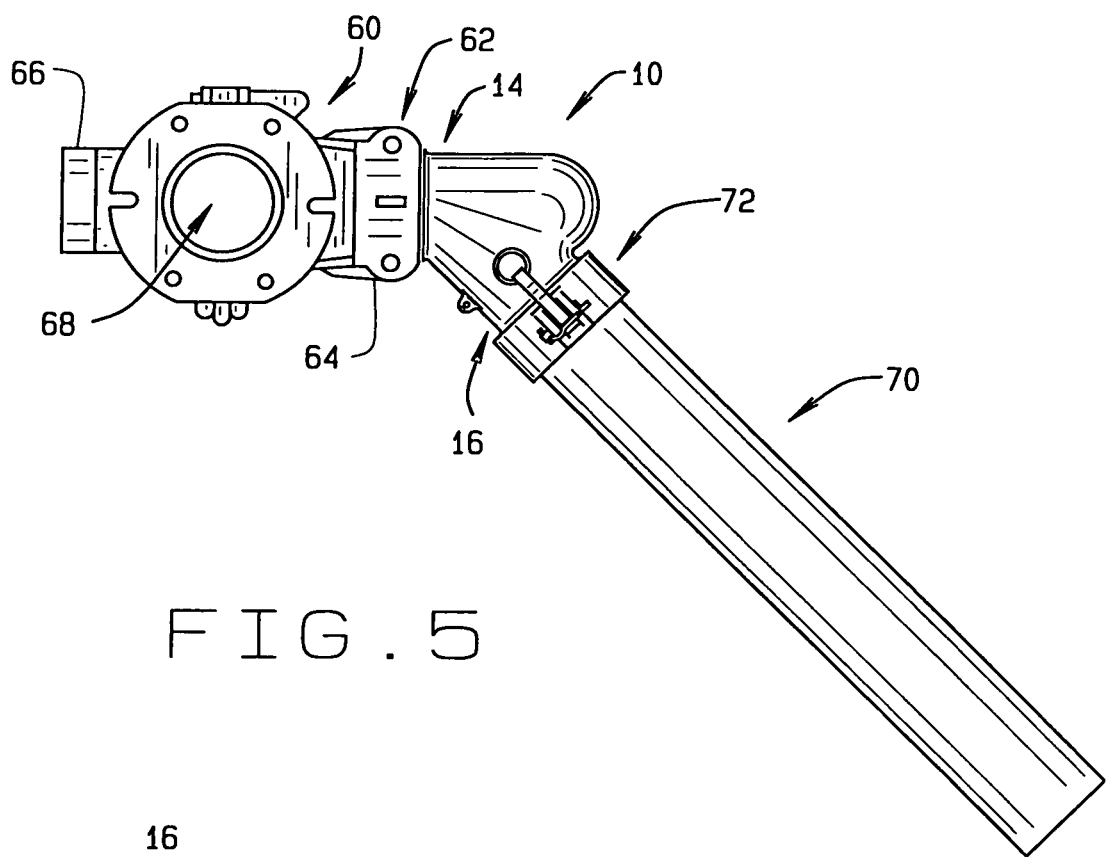
FIG. 5 is a plan view of the unload elbow with spherical wear pocket being connected to a hopper tee and a pipe.

FIG. 5 illustrates the use of the unload elbow 10 being connected directly to a hopper tee 60 for unloading material at a side of a tank trailer (not shown). The unload elbow 10 has the inlet end 14 connected to a coupler 62 that couples the inlet end 14 to an outlet end 64 of the tee 60. The tee 60 also has an inlet end 66 which may be attached to a source of pressurized air for moving material from the tank trailer through a valve device 68, such as a butterfly valve, through the tee 60, the unload elbow 10, and to a pipe 70. The pipe 70 has a female coupler 72 that connects or couples the pipe to the outlet end 16 of the unload elbow 10. The unload elbow 10 also has the wear pocket 18 near the outlet end 16. As has been previously described, a portion of material that moves from the tank trailer through the valve device 68, the tee 60, and into the unload elbow 10 will be trapped in the wear pocket 18. Other material will be able to flow over the trapped portion of material in the wear pocket 18 and out the outlet end 16 into the pipe 70 to be discharged at a different location.

With reference now to FIG. 6, a side perspective view of another embodiment of an unload elbow with spherical wear pocket 100 is illustrated. The unload elbow 100 comprises a body 102 having an inlet end 104, an outlet end 106, and a spherical wear pocket 108 formed or positioned near the outlet end 106. The inlet end 104 has a female connector fitting 110 and the outlet end 106 also has a female connector fitting 112. The female connector fitting 110 has a collar 114 and a lever 116 that has a cam (not shown) at a first end 118 and a pull ring 120 at a second end 122. The cam fits through an opening 124 formed in the collar 114. When the lever 116 is lifted away from the unload elbow 100, the cam is released from a surface, such as the groove 32 shown in FIG. 3. Also, when the lever 116 is pushed toward the unload elbow 100, the cam is engaged in the surface, such as the groove 32. The female connector fitting 110 is used to lock a male connector fitting, such as the male connector fitting 24 depicted in FIG. 3, within the female connector fitting 110. Although not shown in this particular view, it is also possible that the inlet end 104 has another lever 116 on the other side of the collar 114. The female connector fitting 112 on the outlet end 106 also has a collar 126 and a lever 128 that has a cam (not shown) at a first end 130 and a pull ring 132 at a second end 134. The collar 126 may also have an opening 136 formed therein for allowing a cam (not shown) to fit therein. The female connector fitting 112 operates in the same manner as the female connector fitting 110. As can be appreciated, the unload elbow 100 is used in situations where the unload elbow 100 needs to be connected to male couplings or male connector fittings.

FIG. 7 is a side perspective view of another embodiment of an unload elbow with spherical wear pocket 150 constructed according to the present disclosure. The unload elbow 150 comprises a body 152 having an inlet end 154, an outlet end 156, and a spherical wear pocket 158 formed or positioned near the outlet end 156. The inlet end 154 has a male connector fitting 160 and the outlet end also has a female connector fitting 162. The male connector fitting 160 has a groove 164 and a cam surface 166 which are adapted to receive a female connector or coupler (not shown). The female connector fitting 162 has a collar 168 and a lever 170 that has a cam (not shown) at a first end 172 and a pull ring 174 at a second end 176. The unload elbow 150 is used in situations where the inlet end 154 of the unload elbow 150 needs to be connected to a female coupling or a female connector fitting and the outlet end 156 needs to be connected to a male coupling or a male connector fitting. Also, the fittings 160 and 162 are quick disconnect fittings that allow the unload elbow 150 to be quickly disconnected from a pipe, hose, or other conduit.

Referring now in particular to FIG. 8, another embodiment of an unload elbow with spherical wear pocket 200 is depicted. The unload elbow 200 comprises a body 202 having an inlet end 204, an outlet end 206, and a spherical wear pocket 208 formed or positioned near the outlet end 206. The inlet end 204 has a female connector fitting 210 and the outlet end 206 has a male connector fitting 212. The female connector fitting 210 has a collar 214 and a lever 216 that has a cam (not shown) at a first end 218 and a pull ring 220 at a second end 222. The male connector fitting 212 has a groove 224 and a cam surface 226 which are adapted to receive a female connector or coupler (not shown). The unload elbow 200 is used to connect the inlet end 204 to a pipe, hose, or other conduit that has a male connector end and is also used to connect the outlet end 206 to a pipe, hose, or other conduit that has a female connector end.

Figures 9, 10:
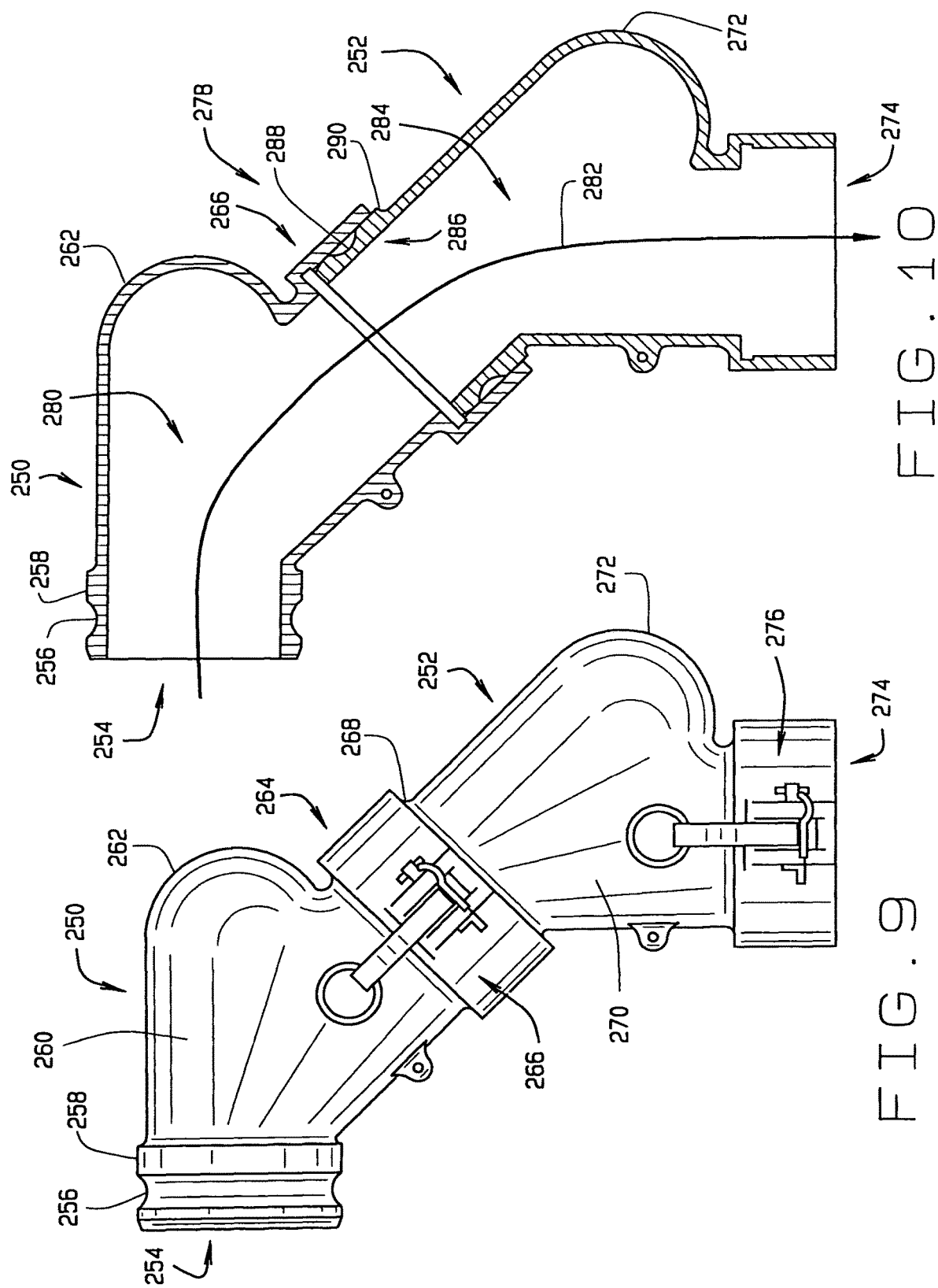
FIG. 9 is a perspective view of a pair of unload elbows with spherical wear pockets connected together.
FIG. 10 is a cross-sectional view of the pair of unload elbows with spherical wear pocket shown in FIG. 9 taken along the plane of line 10-10.

FIG. 9 illustrates how to accomplish a change of direction of 90° by connecting two unload elbows 250 and 252 together. In this particular arrangement, two of the unload elbows 150 are used to configure a change of direction of 90°. The unload elbow 250 has an inlet end 254 having a male connector fitting having a groove 256 and a cam surface 258. The unload elbow also has a body 260 having a wear pocket 262 near an outlet end 264. The outlet end 264 has a female connector fitting 266 that connects to an inlet end 268 of the unload elbow 252. The unload elbow 252 also has a body 270 having a wear pocket 272 near an outlet end 274. The outlet end 274 has a female connector fitting 276 that may connect to a pipe, hose, or other conduit that has a male connector end or fitting.

Referring now to FIG. 10, a cross-sectional view of the two unload elbows 250 and 252 being connected together to form a right angle configuration 278 is shown. The unload elbow 250 has the inlet end 254, a passage 280, and the outlet end 264. An arrow 282 illustrates the flow path of air and material through the unload elbows 250 and 252. The unload elbow 252 has the inlet end 268, a passage 284, and the outlet end 274. In particular, air and material enters the right angle configuration 278 at the inlet end 254 of the unload elbow 250, moves through the passage 280, the outlet end 264, into the inlet end 268 of the unload elbow 252, through the passage 280, and out through the outlet end 274. Although not shown, it should be apparent from the discussion above that a portion of material flowing into the unload elbows 250 and 252 will become trapped or lodged in the wear pockets 262 and 272. In this manner, material will flow over the material trapped in the wear pockets 262 and 272 and the pockets 262 and 272 will not wear down prematurely.

The female connector fitting 266 of the unload elbow 250 is shown being positioned over a male connector fitting 286 formed on the inlet end 268 of the unload elbow 252. The male connector fitting has a groove 288 and a cam surface 290. Although not shown, the female connector fitting 266 has a cam that fits into the groove 288 to lock or connect the unload elbows 250 and 252 together. When the cam is removed from the groove 288, the unload elbows 250 and 252 may be separated from each other. The unload elbow 252 also has the female connector fitting 276 that may be mated to a pipe, hose, or other conduit that has a male connector fitting.

From the aforementioned description, various unload elbows 10, 100, 150, and 200 have been described and disclosed. Each of the unload elbows 10, 100, 150, and 200 is capable of adjusting or changing the direction of flow of material from a tank trailer to prevent damage to where each of the unload elbows 10, 100, 150, and 200 bends to change the direction of flow of material. The unload elbows 10, 100, 150, and 200 may be constructed of various materials including, but not limited to, polymers, high density polyethylene (HDPE), polypropylene (PP), polyvinyl chloride (PVC), nylon, steel, cast iron, ferrous and non-ferrous metals, their alloys and composites.

From all that has been said, it will be clear that there has thus been shown and described herein an unload elbow with spherical wear pocket. It will become apparent to those skilled in the art, however, that many changes, modifications, variations, and other uses and applications of the subject unload elbow with spherical wear pocket are possible and contemplated. All changes, modifications, variations, and other uses and applications which do not depart from the spirit and scope of the disclosure are deemed to be covered by the disclosure, which is limited only by the claims which follow.

I claim:

1. An unload elbow assembly for forming a spherical wear pocket, and used for changing the direction of material flowing through the unload elbow assembly comprising:
    a first unload elbow with spherical wear pocket having a body having an inlet end, an outlet end, a passage between the inlet end and the outlet end, and said spherical wear pocket formed integrally within the passage and near the outlet end, said spherical wear pocket being shaped internally with a spherical surface and provided to create a vortex of material flowing therethrough to be captured, accumulated, and trapped within said pocket to insulate the internal spherical surface against wear from the flowing material during performance of an unloading process; and
    a connector fitting formed around the inlet end, and a connector fitting formed around the outlet end of the unload elbow assembly.

2. The unload elbow with spherical wear pocket of claim 1 wherein the connector fitting formed around the inlet end is a male connector fitting.

3. The unload elbow with spherical wear pocket of claim 1 wherein the connector fitting formed around the inlet end is a female connector fitting.

4. The unload elbow with spherical wear pocket of claim 1 wherein the connector fitting formed around the outlet end is a male connector fitting.

5. The unload elbow with spherical wear pocket of claim 1 wherein the connector fitting formed around the outlet end is a female connector fitting.

6. The unload elbow with spherical wear pocket of claim 1 wherein the connector fitting formed around the inlet end comprises a cam surface.

7. The unload elbow with spherical wear pocket of claim 1 wherein the connector fitting formed around the outlet end comprises a groove and a cam surface.

8. The unload elbow with spherical wear pocket of claim 1 wherein the connector fitting formed around the inlet end comprises a collar having an opening and a lever having a cam that fits through the opening in the collar.

9. The unload elbow assembly of claim 1, and a second unload elbow with spherical wear pocket having a body having an inlet end, an outlet end, a passage between the inlet end and the outlet end, and a spherical wear pocket formed near the outlet end, said spherical wear pocket having an internally shaped surface for generating a vortex of material flowing therethrough to be captured, accumulated, and trapped within said pocket to insulate the internal surface against wear from the flowing material during performance of an unloading process; and
    a connector fitting formed around the inlet end, of said second unload elbow, and a connector fitting formed around the outlet end, of said second unload elbow, and the connector fitting form around the outlet end of said first unload elbow securing directly with the inlet end of said second unload elbow and thereby allowing flowing material to pass through both said first and second unload elbows during an unloading process.

10. The unload elbow assembly of claim 9 wherein the connector fitting formed around the inlet end of the second unload elbow comprises a groove and a cam surface.

11. The unload elbow assembly of claim 9 wherein the connector fitting formed around the outlet end of the first unload elbow comprises a collar having an opening and a lever having a cam that fits through the opening in the collar.

12. The unload elbow assembly of claim 9 wherein each of the wear pockets is capable of trapping material that is being unloaded through each of the unload elbows to trap a portion of material being unloaded so that any other material being unloaded will contact the trapped material and not impact each of the wear pockets to prematurely wear out each of the unload elbows.

13. An unload elbow assembly for forming a 90° change of direction of material flowing through the unload elbow assembly comprising:
    a first unload elbow with spherical wear pocket having a body having an inlet end, an outlet end, a passage between the inlet end and the outlet end, and a spherical wear pocket formed near the outlet end;
    a connector fitting formed around the inlet end, and a connector fitting formed around the outlet end;
    a second unload elbow with spherical wear pocket having a body having an inlet end, an outlet end, a passage between the inlet end and the outlet end, and a spherical wear pocket formed near the outlet end; and
    a connector fitting formed around the inlet end, and a connector fitting formed around the outlet end with the outlet end of the first unload elbow connected directly to the inlet end of the second unload elbow.

\* \* \* \* \*